March 18, 1947.  D. McLACHLAN, JR  2,417,657
X-RAY GONIOMETER CAMERA
Filed Oct. 6, 1944  2 Sheets-Sheet 1

INVENTOR
DAN McLACHLAN, JR.,
BY
ATTORNEY

March 18, 1947.                D. McLACHLAN, JR                  2,417,657
                              X-RAY GONIOMETER CAMERA
                               Filed Oct. 6, 1944                2 Sheets-Sheet 2

INVENTOR.
DAN McLACHLAN, JR.,
BY
ATTORNEY

Patented Mar. 18, 1947

2,417,657

UNITED STATES PATENT OFFICE 2,417,657

X-RAY GONIOMETER CAMERA

Dan McLachlan, Jr., Old Greenwich, Conn., assignor to American Cyanamid Company, New York, N. Y., a corporation of Maine Application October 6, 1944, Serial No. 557,491

4 Claims. (Cl. 250—65)

The present invention relates to an X-ray goniometer camera for producing and recording crystal X-ray diffraction patterns of the distorted reciprocal lattice type, and is particularly concerned with a device of the character described which will project a crystal X-ray diffraction pattern onto an X-ray sensitive photographic film so that there will be a simple functional relationship between the positions of the diffraction spots on the film and the corresponding positions of the crystal during the production of the spots.

The principal object of the invention is the production of a simple device which will accomplish the above purpose with a single actuating means, which will not require special types or shapes of photographic film or plates which may be run at any desired speed and which will be of sturdy construction capable of maintaining the adjustment of the parts once they are set in the desired position so as to insure accuracy of results.

To this end the invention contemplates an apparatus for and the method of projecting a collimated X-ray beam onto a crystal undergoing study while the crystal is rotating simultaneously about an axis including the X-ray beam and one of its own crystallographic axes, rotation about both axes being at the same speed and at right angles to each other, and interposing in the path of the desired portion of the diffraction pattern a stationary X-ray sensitive photographic surface. Thus there is produced an X-ray diffraction pattern of the distorted reciprocal lattice type.

The invention further contemplates a mechanism for accomplishing the above which includes the usual adjuncts and supplementary devices such as crystal adjusting devices and apertured screens of X-ray opaque material so as not only to restrict the X-ray beam but to block from the photographic surface the undesired portions of the crystal diffracted X-rays. The invention further contemplates the novel method more fully hereinafter described and shown in the accompanying drawings in which.

Figure 1:
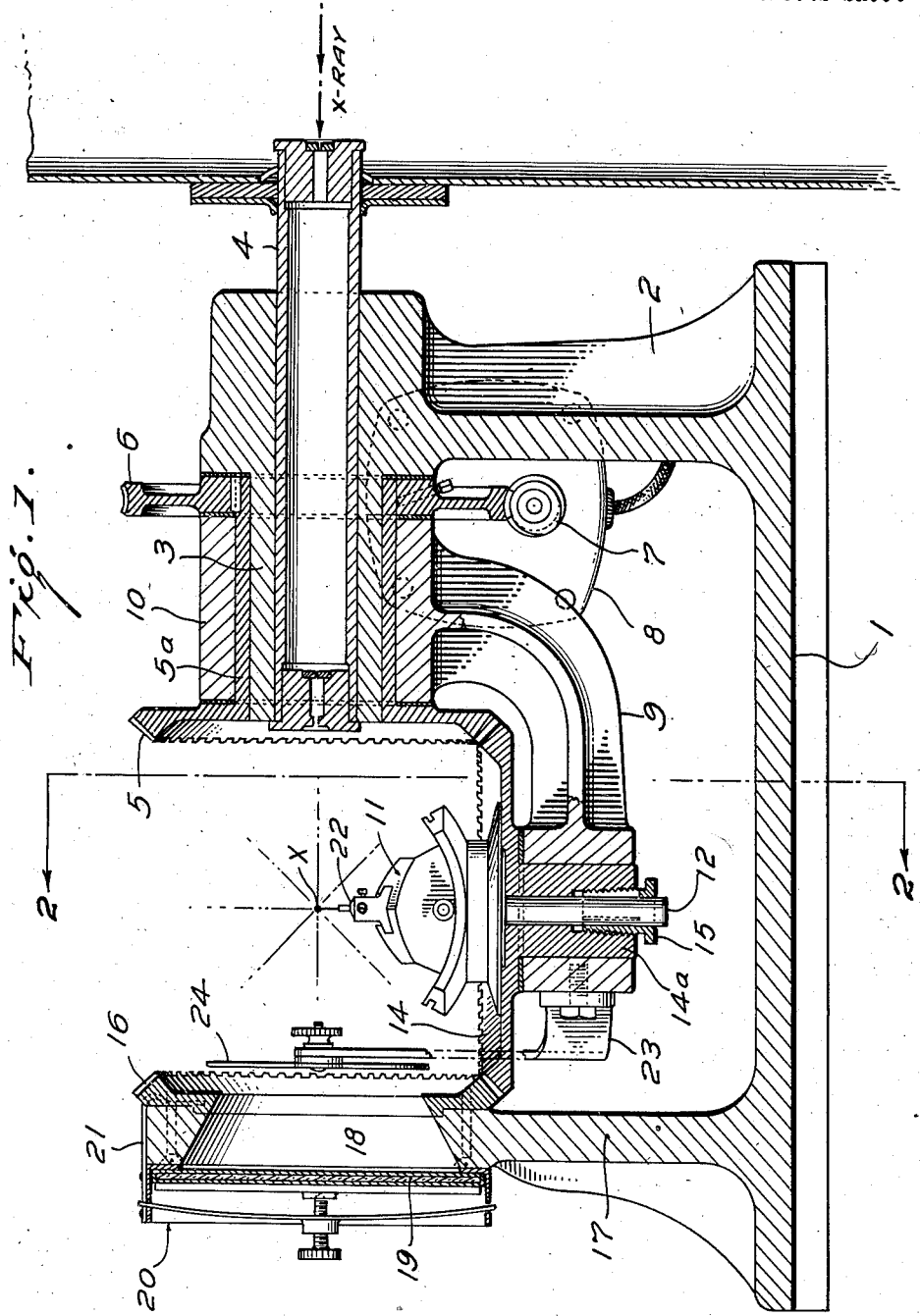
Fig. 1 is a side view of a device constructed according to the invention.
Figure 2:
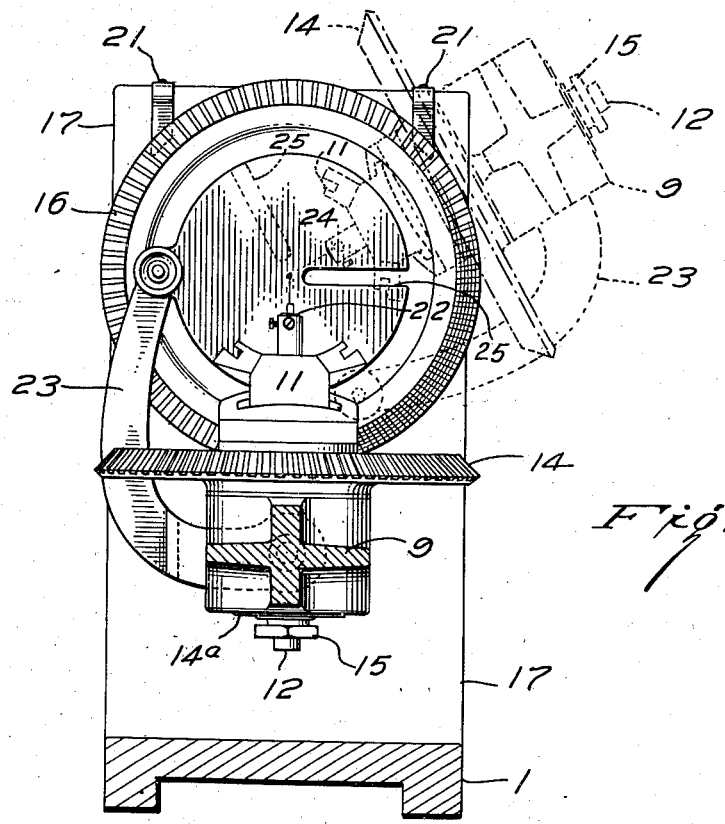
Fig. 2 is a view partly in section along the line 2—2 of Fig. 1 with the parts rotated from that position.
Figure 3:
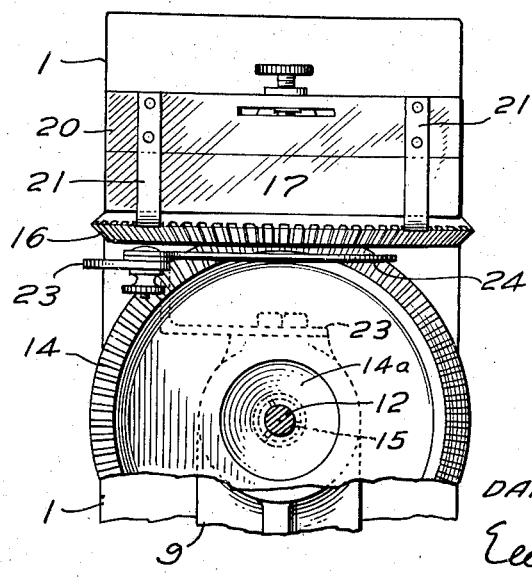
Fig. 3 is a fragmentary plan view of the left-hand end portion of the device of Fig. 1.

Referring with particularity to the drawings which show a device for accomplishing the stated purpose, there is shown at 1 a base having support 2 thereon which terminates at its top portion in a cored journal 3. In the core of the journal is fitted the usual collimating tube 4 adapted to receive X-ray beams from a source (not shown) and transmit a restricted number of substantially parallel rays.

Upon the journal 3 is mounted a sleeve portion 5a of a mitred gear 5. A worm gear 6, driven by worm 7 from motor 8 is fixedly secured to the sleeve 5a and transmits rotary motion from the motor to the gear 5.

Bracket 9 is provided with a portion 10 which surrounds the sleeve portion 5a so as to permit relative rotary motion therebetween.

The bracket 9 also carries a crystal holder adjusting device 11 of a standard type capable of angular and translational adjustment. This adjustment device is provided with a spindle 12 mounted in the hub 14a of a mitred gear 14 the teeth of which are similar in all respects to those on the mitred gear 5. A tapered draw chuck 15 threaded to the bottom of the hub 14a may be made to closely engage the spindle 12 and thus secure the adjusting device in the hub in a fixed position.

A third mitred gear 16 of the ring type is secured to end support 17. The teeth of the gear 16 are similar in all respects to those of gears 14 and 5.

The support 17 is provided with an aperture 18 closed at the rear with an X-ray sensitive photographic film or plate 19 held in holder 20 which may be conveniently hung from the top of support 17 as by spring clips 21.

The adjusting device 11 is provided with a crystal holder 22 capable of vertical adjustment and adapted by reason of this adjustment and the device 11 to place a crystal at substantially the point X so that it and one of its crystallographic axes about which it rotates is in the path of the X-ray beam transmitted through the collimating tube 4.

Fixed to the bracket 9 and movable therewith is an angular arm 23 carrying a lead screen 24 having slotted aperture 25 therein so as to restrict the X-ray beams diffracted from the crystal which fall upon the X-ray sensitive photographic surface 19.

It will be apparent that rotation of the gear 5 causes rotation of the gear 14 as the two are meshed together, the latter serving as an idler between the gears 5 and 16. Rotation of the gear 14 causes rotation of the adjusting device 11 and the crystal mounted in the crystal holder 22. Due to the normal and well understood functioning of the device 11, the crystal undergoing study and mounted at X may be made to rotate about one of its crystallographic axes. As gear 5 is meshed with gear 14 which in turn is mounted in the bracket 9, rotation of the crystal about the axis of the X-ray beam projected through the collimating tube 4 takes place simultaneously with the rotation of the crystal about one of its crystallographic axes. It is important that the crystallographic axis about which the crystal rotates be at right angles to the axis of the X-ray beam about which it also rotates which may be readily brought about by the adjusting mechanisms 11 and 22.

As the lead screen 24 rotates with the bracket 9 about the axis of the collimating X-ray beam, the slotted aperture 25 which permits the diffraction pattern to go through to the photographic surface will always occupy the same relative position with regard to the crystal undergoing study.

In operation the usual source of X-ray (not shown) is provided at the right hand end of the device and an X-ray beam passes through the collimating tube 4 having its usual and ordinary X-ray opaque screens or blocks so as to insure the projection of parallel X-rays toward the crystal. These parallel X-rays strike the rotating crystal, are diffracted and the desired portions of the diffracted rays pass through the slit 25 onto the stationary X-ray sensitive photographic surface 19. Due to the fact that the crystal undergoing study is simultaneously rotating on two axes at right angles to each other and at the same speed, the diffraction pattern which passes the slit 25 and is intercepted by photographic surface 19, is of the distorted reciprocal lattice type.

Rotation of the crystal about the two axes may take place at varying speeds so long as both phases of rotation are the same and at right angles to each other. The time of exposure will be determined by the type of crystal undergoing study, the size thereof, the quantity of X-ray passing through the collimating tube, the sensitiveness of the photographic surface and the exact type of image which it is desired to have recorded or any one or more of these variables. Such adjustments are well known to the man skilled in the art and need not be further specified here.

While the invention has been described with particular reference to specific embodiments, yet it is to be understood that the invention is not to be limited thereto, but is to be construed broadly and restricted solely by the scope of the appended claims.

What is claimed:

1. A method of producing and recording a crystal X-ray diffraction pattern of the distorted reciprocal lattice type, which includes rotating a crystal about one of its crystallographic axes, projecting a collimated X-ray beam against said crystal at right angles to the said axis, rotating the crystal about the axis of the X-ray beam, rotation of the crystal about one crystallographic axis being simultaneous with and proportional to its rotation about the X-ray beam axis, and projecting the resultant diffraction pattern on a stationary X-ray sensitive photogrphic surface, while excluding undesirable diffraction beams therefrom.

2. The method of claim 1 in which the speed of rotation of the crystal about both axes is the same.

3. A method of producing and recording a crystal X-ray diffraction pattern of the distorted reciprocal lattice type which includes rotating a crystal about one of its crystallographic axes, projecting a collimated X-ray beam against said crystal at right angles to its said axis of rotation, simultaneously rotating the crystal about the axis of the collimated X-ray beam, the speed of rotation of the crystal about both axes being the same, and projecting and recording the diffraction pattern on an X-ray sensitive photographic surface.

4. An X-ray goniometer camera including a crystal holder adapted to hold a crystal, means to project a collimated X-ray beam through a crystal in said holder, means to rotate the crystal about the X-ray beam as an axis, means to rotate the crystal about a crystallographic axis of the crystal and at right angles to the axis of the X-ray beam, rotation of the crystal about one crystallographic axis being simultaneous with and proportional to its rotation about the X-ray beam axis and means for stationarily holding an X-ray sensitive photographic surface in the path of a rotating X-ray diffraction pattern produced by the X-ray striking the crystal.

DAN McLACHLAN, Jr.

REFERENCES CITED

The following references are of record in the file of this patent:

UNITED STATES PATENTS

| Number | Name | Date |
| --- | --- | --- |
| 2,319,350 | Schiebold | May 18, 1943 |
| 2,380,235 | Harker | July 10, 1945 |
| 2,380,236 | Harker | July 10, 1945 |